United States Patent Office 3,342,868
Patented Sept. 19, 1967

3,342,868
1,1,2,2-TETRAFORMYLETHANE, ITS PREPARATION AND ITS SALTS
Swiatoslaw Trofimenko, Wilmington, Del., assignor to E. I. du Pont de Nemours and Company, Wilmington, Del., a corporation of Delaware
No Drawing. Filed Nov. 30, 1962, Ser. No. 241,180
9 Claims. (Cl. 260—601)

This invention relates to a new organic compound containing four formyl groups and having a strongly acidic character, to its salts and to its preparation.

The new compounds made available by this invention are 1,1,2,2-tetraformylethane, its salts with monovalent metal, ammonium and substituted ammonium cations. The invention also includes a method of preparing 1,1,2,2-tetraformylethane which comprises cleaving 3,4-diformylfuran with an alkali metal hydroxide or quaternary ammonium hydroxide, thereby forming a salt of 1,1,2,2-tetraformylethane, and liberating the free 1,1,2,2-tetraformylethane from said salt by acidification.

While the name 1,1,2,2-tetraformylethane will be the one most frequently used in this discussion, the compound exists in desmotropic or tautomeric equilibrium with its dienediol form, 2,3-diformyl-1,4-dihydroxy-1,3-butadiene, and it can be represented equally well by either of the formulas

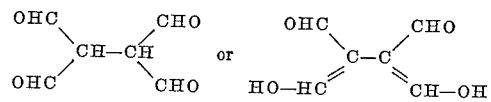

In modern usage, this phenomenon is depicted by a structure such as

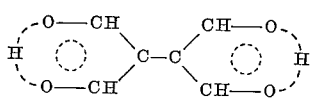

and the salts of tetraformylethane are shown as follows, using the potassium salt as an example:

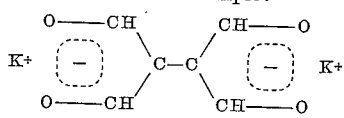

Using conventional symbolization, the process of preparing 1,1,2,2-tetraformylethane starting with 3,4-diformylfuran is formally represented by the following equation, where M stands for an alkali metal cation or quaternary ammonium cation:

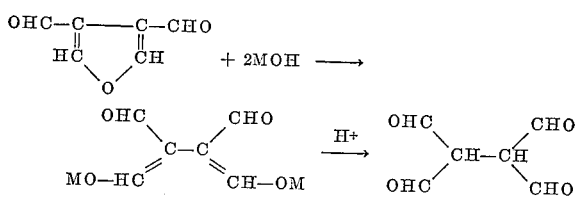

A few other compounds having two directly linked 1,3-dicarbonyl systems have been reported, of which the one superficially most closely resembling tetraformylethane is 1,1,2,2-tetraacetylethane (or 3,4-diacetyl-2,5-dihydroxy-2,4-hexadiene), first described by Mulliken in Am. Chem. J. 15, 530 (1890). However, 1,1,2,2-tetraformylethane possesses unique properties which make it wholly and unexpectedly different, in kind rather than in degree, from these prior tetracarbonyl compounds. Thus, for example, it is quite soluble in water; it is strongly acidic (pH of saturated solution=2.35) and can be liberated from its salt only by very strong acids such as hydrochloric acid and sulfuric acid; and it is a strong reducing agent, being oxidized by the ferric ion almost instantaneously, as evidenced by the disappearance within ten seconds of the deep dark color of the complex initially formed with ferric chloride. In contrast, tetraacetylethane is substantially insoluble in water; it is a very weak acid (pH of saturated solution=6.60), being only difficultly soluble in aqueous sodium carbonate, and being easily liberated from its salts by weak acids such as acetic acid; and it is not oxidized by the ferric ion, as shown by the fact that the color of its ferric chloride complex remains unchanged after 100 hours.

The starting material used in the preparation of 1,1,2,2-tetraformylethane is 3,4-diformylfuran. This is also a new compound. It can be prepared by the following reaction sequence:

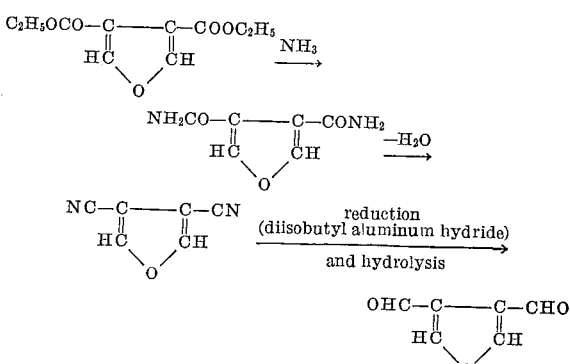

A typical preparation of the starting material is described below as Example A:

EXAMPLE A (1) *3,4-dicarbamoylfuran.*—A mixture of 20 g. of 3,4-dicarbethoxyfuran [prepared essentially as described by Kornfeld and Jones in J. Org. Chem. 19, 1674 (1954)], 50 ml. of concentrated aqueous ammonia and 10 ml. of methanol was heated in a sealed vessel at about 100° C. for 4 hours. Upon cooling, a crystalline material separated from the reaction mixture. This was collected by filtration, washed with ice water, decolorized with charcoal and recrystallized from boiling water. After drying at 55° C. under vacuum, the crystals melted at 270–275° C. Elemental and infrared analyses showed that this product was 3,4-dicarbamoylfuran.

(2) *3,4-dicyanofuran.*—A suspension of 30 g. of 3,4-dicarbamoylfuran in 250 g. of phosphorus oxychloride was heated to reflux for one hour. Excess phosphorus oxychloride was decomposed by addition of ice and the mixture was filtered to recover crystalline 3,4-dicyanofuran. Additional product was obtained by ether extraction of the filtrate and evaporation of the ether. The combined product was recrystallized from boiling water to give essentially pure 3,4-dicyanofuran, M.P. 159–160° C. The identity of the product was established by comparison of the infrared spectra and mixed melting point with an authentic sample prepared by a different method.

(3) *3,4-diformylfuran.*—To a stirred suspension under nitrogen atmosphere of 6.0 g. (0.051 mole) of 3,4-dicyanofuran in 150 ml. of dry benzene was added slowly at room temperature 21 ml. (0.114 mole) of diisobutyl aluminum hydride. The mixture turned amber, warmed up to about 50° C., and the solid went into solution. Toward the end of the addition the solution became viscous and gelatinous. After being stirred for 2 hours at room temperature, the complex was decomposed by careful addition of methanol (an exothermic reaction accompanied by gas evolution).

The almost solid mixture was then transferred to an open vessel and decomposed further with ice and dilute sulfuric acid until all the lumps dissolved. The organic and aqueous layers were separated and the aqueous layer was extracted four times with 200-ml. portions of ether. The ether extracts and the organic layer were combined, dried, stirred with decolorizing carbon and filtered. Removal of the solvent from the filtrate left a residue which was recrystallized from carbon tetrachloride to give a first crop (2.8 g.) melting at 77–78° C. Additional product (0.7 g.) was obtained by evaporation of the mother liquor, sublimation of the residue and recrystallization of the oily sublimate from carbon tetrachloride. The total yield of 3,4-diformylfuran was 56%.

*Analysis.*—Cal'd for $C_6H_4O_3$: C, 58.1; H 3.25; mol. wt., 124. Found: C, 58.5; H, 3.52; mol. wt., 129. (B.P. in ethylene chloride).

The infrared spectrum showed absorptions at 3.19, 3.47; 5.94, 6.42, 6.51, 6.94, 7.03, 7.10, 7.30, 7.77, 8.18, 8.39, 8.88, 9.39, 11.57, 12.24 and 13.97µ.

To prepare 1,1,2,2 - tetraformylethane, 3,4-diformylfuran is first brought in contact with a strong base, which can be an alkali metal hydroxide, preferably potassium or sodium hydroxide, or a quaternary ammonium hydroxide. The latter can be any of the known bases of the general formula.

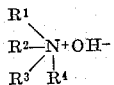

where $R^1$–$R^4$ are hydrocarbon radicals, $R^1$, $R^2$ and $R^3$ being separate radicals or radicals which, together and jointly with the nitrogen atom, form a heterocyclic ring, preferably of 5–6 ring atoms. The most readily available quaternary ammonium bases are those in which any radical attached to the amino nitrogen contains from 1–18 carbon atoms. Examples of suitable quaternary ammonium bases include tetramethyl-, tetraethyl-, tetrabutyl-, tributylpropyl-, hexyltrimethyl-, octyltrimethyl-, dodecyltrimethyl-, dimethyldibenzyl-, octadecyldimethylbenzol-, phenyltrimethylammonium hydroxide, N,N - diethylpyrrolidinium hydroxide, N,N - dimethylpiperidinium hydroxide, N - dodecylpyridinium hydroxide, etc. Tetraalkylammonium hydroxides are preferred.

The reaction is conveniently conducted in a liquid medium in which both reactants are at least partly soluble, such as water or a lower alkanol or mixture of these solvents. The reaction is mildly exothermic and takes place rapidly without heating, desirably at an external temperature in the ragne of about 0–50° C., although brief warming can be applied to complete the process. Preferably, the base is used in amounts at least equivalent to the 3,4-diformylfuran, i.e., two moles per mole, or in excess thereover, although these proportions are not critical.

The reaction results in cleavage of the 3,4-diformylfuran and formation of the alkali metal salt or quaternary ammonium salt of 1,1,2,2 - tetraformylethane. The salt precipitates out of the reaction mixture or, if it is soluble in the reaction medium employed, the latter can be evaporated to recover the salt.

The free acid, i.e., 1,1,2,2-tetraformylethane, can be obtained by acidifying an aqueous solution of the salt with a strong inorganic or organic acid such as hydrochloric acid, sulfuric acid or trichloroacetic acid. Since 1,1,2,2-tetroformylethane is soluble in water, concentrated aqueous solutions should be used to minimize losses due to solubility. The salt can be isolated prior to acidification but this is not essential since the reaction mixture resulting from the first step can be acidified directly.

1,1,2,2-tetraformylethane can also be regenerated by treating an aqueous solution of its salts with one of the well known acidic ion exchange resins, whereby the metal or quaternary ammonium cation is replaced by hydrogen.

Many salts of 1,1,2,2 - tetraformylethane (or 2,3-diformyl-1,4-dihydroxy - 1,3 - butadiene) are obtainable directly from 3,4-diformylfuran by the method described above. These and other salts can also be made from preformed tetraformylethane by neutralization with monovalent metal hydroxides, ammonium or substituted ammonium hydroxides, or primary, secondary or tertiary amines; or by metathetical reactions between an alkali metal salt of tetraformylethane and a monovalent metal salt of another acid. It is thus possible to obtain salts (more precisely called tetraformylethanediides) of monovalent metals, such as lithium, sodium, potassium, rubidium, cesium, copper (I) or silver (I), these salts being represented by the formula

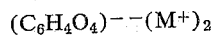

where M is a monovalent metal; and ammonium and hydrocarbylammonium salts, these salts being represented by the formula

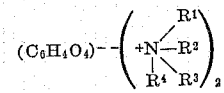

where $R^4$ is hydrogen or hydrocarbon; $R^1$, $R^2$ and $R^3$ are hydrogen, separate hydrocarbon radicals wherein any unsaturation is aromatic unsaturation or hydrocarbon radicals which, together and jointly with the amino nitrogen, form a heterocyclic ring, preferably of 5–6 ring atoms. Preferably, any radical attached to the amino nitrogen contains from 1–18 carbon atoms. Examples of such ammonium and substituted ammonium tetraformylethanediides (in addition to those, already mentioned, which are obtained by cleavage of 3,4-diformylfuran with quaternary ammonium hydroxides) include those in which the

group is ammonium, methylammonium, dimethylammonium, triethylammonium, t-butylammonium, dipropylbutylammonium, dioctadecylammonium, dicyclohexylammonium, phenylammonium, dimethylphenylammonium, p-tolylammonium, dibenzylammonium, pyrrolinium, pyrrolidinium, N-methylpiperidinium, pyridinium, etc.

The following examples illustrate the invention.

EXAMPLE 1

*Potassium 1,1,2,2-tetraformylethanediide*

3,4-diformylfuran (0.73 g.) was stirred at room temperature with a large excess of potassium hydroxide dissolved in methanol. An exothermic reaction occurred and a white solid separated. It was filtered, washed with small amounts of methanol (with some solubility losses) and dried. There was obtained 1.1 g. (86% yield) of potassium 1,1,2,2-tetraformylethanediide.

The salt gave a positive test with 2,4-dinitrophenylhydrazine and a very intense ferric chloride color test that faded rapidly. Its ultraviolet spectrum showed absorption maximum at 270 mµ ($\epsilon=39,800$).

EXAMPLE 2

*1,1,2,2-tetraformylethane*

The dipotassium salt of Example 1 (0.47 g.) was dissolved in water and the solution was run through a column of a commercial acidic cation-exchange resin consisting chiefly of polystyrenesulfonic acid. The acid eluate (pH 2) was evaporated to dryness, yielding 0.23 g. (74% yield) of 1,1,2,2-tetraformylethane as a white solid. This was purified by sublimation at 170° C. and 5 mm. pressure. The product decomposes at 194–199° C.

*Analysis.*—Calc'd for $C_6H_6O_4$: C, 50.71; H, 4.26. Found: C, 50.78; H, 4.08.

On resublimation of 1,1,2,2-tetraformylethane that has been stored for some time, a small amount of a more volatile material was obtained. This was identified as 3,4-diformylfuran by mixed melting point and comparison of the infrared spectra.

EXAMPLE 3

1,1,2,2-tetraformylethane was prepared more directly in one step as follows: A suspension of 1.24 g. of 3,4-diformylfuran in 10 ml. of water was treated at room temperature with 1.4 g. of potassium hydroxide pellets. An exothermic reaction took place. The dark yellow solution was stirred for one hour, then cooled and acidified with concentrated hydrochloric acid. The precipitate was washed with water and ethanol and air-dried. There was obtained 1.1 g. (78% yield) of 1,1,2,2-tetraformylethane.

EXAMPLE 4

Sodium 1,1,2,2-tetraformylethanediide 1,1,2,2-tetraformylethane was suspended in water and titrated with aqueous sodium hydroxide to the end point of phenolphthalein. The solution was stirred with decolorizing carbon and filtered and the filtrate was evaporated under reduced pressure. The sticky residue was boiled with ethanol and filtered. The solid sodium 1,1,2,2-tetraformylethanediide was washed with ethanol and dried at reduced pressure, then dried further at 110° C. and 1 mm. pressure.

The salt remained unchanged on heating up to 300° C. Its infrared spectrum showed absorption bands at 6.5 (broad), 7.3 (broad), 7.80, 7.94, 8.06, 12.25 (shoulder at 12.50) and 13.42 (shoulder at 13.80) $\mu$.

EXAMPLE 5

Ammonium 1,1,2,2-tetraformylethanediide 1,1,2,2-tetraformylethane (0.5 g.) was stirred in excess concentrated aqueous ammonia at room temperature. A precipitate formed. After 6 hours, the mixture was filtered and the solid was dried in air. There was obtained 0.26 g. of ammonium 1,1,2,2-tetraformylethanediide (considerable solubility losses occurred, as the salt is readily soluble in water). The salt can be sublimed with some decomposition.

EXAMPLE 6 t-Butylammonium 1,1,2,2-tetraformylethanediide

A stirred aqueous suspension of 0.248 g. of 1,1,2,2-tetraformylethane was treated with excess t-butylamine. Evaporation of the resulting solution at reduced pressure left a semisolid which crystallized on being triturated with ethanol. There was thus obtained about 0.4 g. (80% yield) of t-butylammonium 1,1,2,2-tetraformylethanediide, M.P. 94–96° C., decomposing at 130° C. with vigorous bubbling. The infrared spectrum was in agreement with the assigned structure.

EXAMPLE 7

Tetramethylammonium 1,1,2,2-tetraformylethanediide 3,4-diformylfuran (1.54 g., 0.01235 mole) was stirred at room temperature with 22.4 g. of 10% aqueous tetramethylammonium hydroxide (0.0247 mole). The solution was warmed briefly and then evaporated to dryness. The crude salt, obtained in quantitative yield, was recrystallized from isopropyl alcohol and dried at 130° C. and 5 mm. pressure. Tetramethylammonium 1,1,2,2-tetraformylethanediide decomposes at 216–217° C. with evolution of trimethylamine and prior darkening. It is very hygroscopic.

*Analysis.*—Calc'd for $C_{14}H_{28}N_2O_4$: C, 58.3; H, 9.79; N, 9.71. Found: C, 57.1; H, 9.73; N, 10.1.

EXAMPLE 8

Tetraethylammonium 1,1,2,2-tetraformylethanediide

This salt was prepared by stirring 0.435 g. (0.003065 mole) of 1,1,2,2-tetraformylethane with 9.03 g. of 10% aqueous tetraethylammonium hydroxide (0.00613 mole) and evaporating the solution at reduced pressure. The salt was obtained as a yellow syrup that did not crystallize readily. It is soluble in methanol.

EXAMPLE 9

Silver 1,1,2,2-tetraformylethanediide

An aqueous solution of sodium 1,1,2,2 - tetraformylethanediide was treated with an equivalent amount of aqueous silver nitrate. A white precipitate formed which was filtered and washed rapidly with water. This was silver 1,1,2,2-tetraformylethanediide, further identified by its infrared spectrum, which is very similar to that of the sodium salt.

Pyrolysis of the silver salt gave two sublimable products, identified as 3,4 - diformylfuran and 1,1,2,2 - tetraformylethane.

EXAMPLE 10

Cesium 1,1,2,2-tetraformylethanediide

A stirred suspension of 0.867 g. (0.00483 mole) of 1,1,2,2-tetraformylethane in 5 ml. of water was titrated with 9.55 ml. of 1.01 M aqueous cesium hydroxide (0.00966 mole). The resulting solution was evaporated under reduced pressure to semi-dryness and the syrupy residue was stirred with boiling ethanol. After cooling and filtering, the solid cesium 1,1,2,2-tetraformylethanediide was dried at 135° C. and 5 mm. pressure. It decomposes at 173–175° C. with darkening above about 148° C.

The products of this invention have a variety of uses. 1,1,2,2-tetraformylethane precipitates metals from solutions of their salts or oxides, and thus is useful as a metal sequestering agent. It is also useful as a reducing agent. The salts of 1,1,2,2-tetraformylethane with alkali metal or ammonium cations, as well as tetraformylethane itself, are soluble in water and they have the valuable property of preventing or substantially retarding the corrosion of steel and other ferrous metals. This corrosion inhibiting property was demonstrated in tests such as the following, where strips of autobody steel were immersed in (A) distilled water; (B) a saturated solution of 1,1,2,2-tetraformylethane in distilled water; (C) a solution of sodium 1,1,2,2-tetraformylethanediide (3.75% by weight) in distilled water. After 24 hours at room temperature, the steel in (A) was spotted with corrosion and the solution was murky with hydrated oxides of iron; the steel in (B) remained entirely free of corrosion for several days; the steel in (C) was still spotless after 500 hours.

1,1,2,2-tetraformylethane is useful as an inhibitor of vinyl polymerization. This property was demonstrated in tests such as the following: A solution was prepared from 0.012 g. of azobis-isobutyronitrile (as the polymerization initiator) in 65 ml. of redistilled vinyl acetate. A 7-ml. portion (sample 1) of this solution was used as the control. To another 7-ml. portion (sample 2) of this solution was added 0.020 g. of 1,1,2,2-tetraformylethane.

Each test solution was heated at 70° C. for one hour, after which the extent of polymerization was determined by appearance (gelling) and/or by pouring the solution into 50 ml. of hexane to precipitate the polymer. Sample 1 was completely polymerized. No polymer was detected in Sample 2.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. 1,1,2,2-tetraformylethane.
2. Monovalent metal salts of 1,1,1,2-tetraformylethane having the formula $$(C_6H_4O_4)^{--}(M^+)_2$$

wherein $(C_6H_4O_4)^{--}$ is the 1,1,2,2 - tetraformylethanediide anion and $M^+$ is the cation of a monovalent metal.

3. Potassium 1,1,2,2-tetraformylethanediide.
4. Sodium 1,1,2,2-tetraformylethanediide.
5. Salts of 1,1,2,2 - tetraformylethane having the formula

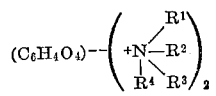

wherein $(C_6H_4O_4)^{--}$ is the 1,1,2,2-tetraformylethanediide anion, $R^1$, $R^2$ and $R^3$ are selected from the group consisting of hydrogen, separate hydrocarbon radicals containing up to 18 carbons, wherein any unsaturation is aromatic unsaturation, and hydrocarbon radicals which, together and jointly with the amino nitrogen, form a heterocyclic ring having 5–6 ring atoms; and $R^4$ is selected from the group consisting of hydrogen and separate hydrocarbon radicals containing up to 18 carbons, wherein any unsaturation is aromatic unsaturation.

6. Ammonium 1,1,2,2-tetraformylethanediide.
7. Process for preparing 1,1,2,2 - tetraformylethane which comprises cleaving 3,4-diformylfuran with a strong base selected from the group consisting of alkali metal hydroxides and quaternary ammonium hydroxides selected from the group consisting of tetraalkylammonium hydroxides, each alkyl group containing up to 18 carbons, dimethyldibenzylammonium hydroxide, octadecyldimethylbenzylammonium hydroxide, phenyltrimethylammonium hydroxide, N,N-diethylpyrrolidinium hydroxide, N,N-dimethylpiperidinium hydroxide and N-dodecylpyridinium hydroxide, thereby forming a salt of 1,1,2,2-tetraformylethane, and acidifying an aqueous solution of said salt with a member selected from the group consisting of strong acids and acidic ion exchange resins, thereby liberating the free 1,1,2,2,-tetraformylethane from said salt.

8. Process for preparing a salt of 1,1,2,2-tetraformylethane selected from the group consisting of alkali metal salts and quaternary ammonium salts which comprises cleaving 3,4-diformylfuran with a strong base selected from the group consisting of alkali metal hydroxides and quaternary ammonium hydroxides selected from the group consisting of tetraalkylammonium hydroxide, each alkyl containing up to 18 carbons, dimethyldibenzylammonium hydroxide, octadecyldimethylbenzylammonium hydroxide, phenyltrimethylammonium hydroxide, N,N-diethylpyrrolidinium hydroxide, N,N-dimethylpiperidinium hydroxide and N-dodecylpyridinium hydroxide, and isolating said salt from the reaction mixture.

9. A compound selected from the class consisting of 1,1,2,2-tetraformylethane, salts of 1,1,2,2-tetraformylethane with monovalent metal, ammonium and substituted ammonium cations, said monovalent metal salts having the formula

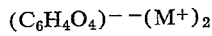

$$(C_6H_4O_4)^{--}(M^+)_2$$

and said ammonium and substituted ammonium salts having the formula

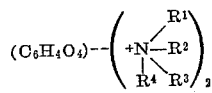

wherein $(C_6H_4O_4)^{--}$ is the 1,1,2,2,-tetraformylethanediide anion, $R^1$, $R^2$ and $R^3$ are selected from the group consisting of hydrogen, separate hydrocarbon radicals containing up to 18 carbons, wherein an unsaturation is aromatic unsaturation, and hydrocarbon radicals which, together and jointly with the amino nitrogen, form a heterocyclic ring having 5–6 ring atoms; and $R^4$ is selected from the group consisting of hydrogen and separate hydrocarbon radicals containing up to 18 carbons, wherein any unsaturation is aromatic unsaturation.

No references cited.

LEON ZITVER, *Primary Examiner.*

R. H. LILES, *Assistant Examiner.*

UNITED STATES PATENT OFFICE
CERTIFICATE OF CORRECTION

Patent No. 3,342,868 September 19, 1967

Swiatoslaw Trofimenko

It is hereby certified that error appears in the above numbered patent requiring correction and that the said Letters Patent should read as corrected below.

Column 3, line 37, for "octadecyldimethylbenzol" read -- octadecyldimethylbenzyl --; line 63, for "tetroformylethane" read -- tetraformylethane --; column 6, line 71, for "1,1,1,2-tetraformylethane" read -- 1,1,2,2-tetraformylethane --; column 7, line 25, for "hydroxides" read -- hydroxide --; column 8, line 4, after "alkyl" insert -- group --; line 27, for "an" read -- any --.

Signed and sealed this 22nd day of October 1968.

(SEAL)
Attest:

Edward M. Fletcher, Jr.
Attesting Officer

EDWARD J. BRENNER
Commissioner of Patents